March 8, 1966   C. L. CHURCHMAN   3,239,174
GUIDE AND HOLDER DEVICE FOR A FLAT PERFORATED GARDEN HOSE
Filed Sept. 18, 1964
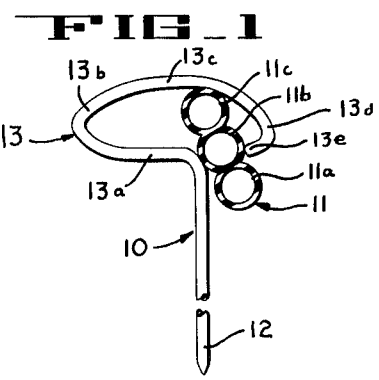
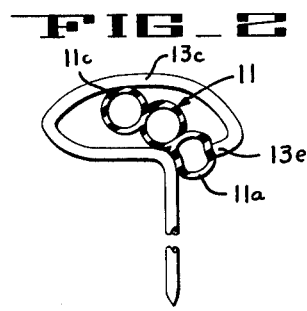
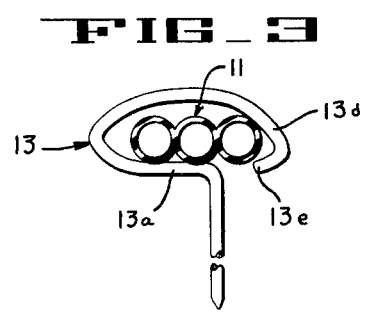
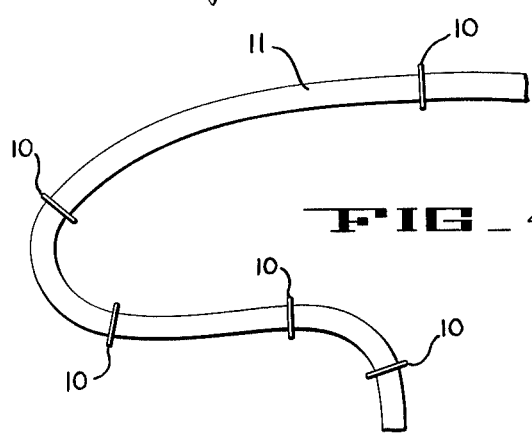
INVENTOR
CLAIR L. CHURCHMAN
BY United States Patent Office 3,239,174
Patented Mar. 8, 1966

3,239,174
GUIDE AND HOLDER DEVICE FOR A FLAT
PERFORATED GARDEN HOSE
Clair L. Churchman, 209 Melbrae Lane, Apt. 4,
Los Gatos, Calif.
Filed Sept. 18, 1964, Ser. No. 397,465
1 Claim. (Cl. 248—87)

This invention relates to a guide and holder device for a flat perforated garden hose which provides a spray through out its entire length.

An object of this invention is to provide an improved guide and holder device for flat perforated garden hose, said device being constructed of wire material provided with a hook in the upper part thereof for receiving and retaining the garden hose, the lower end of said device being pointed so that it may be easily inserted into the ground.

Another object of this invention is to provide an improved guide and holder for a flat perforated garden hose, said guide and holder being constructed of wire material and the hose receiving part thereof being in the form of a hook which may be placed around the hose so that the hose is retained therein, said garden hose holder also being constructed so that the hook portion thereof fits loosely on the hose so that a plurality of the holders such as may be required to hold the length of hose in a predetermined pattern over the area being sprayed, may be coiled up with the hose after the spraying operation is completed and the hose is removed from the spraying area.

Other and further objects of this invention will be apparent to those skilled in the art to which the invention relates from the following specification, claim, and drawing in which, briefly:

FIG. 1 is a side view of an embodiment of this hose guide and holder device showing the initial step in inserting the multiple channel perforated garden hose therein;

FIG. 2 is a view similar to FIG. 1 showing the hose slightly deformed in the final stage of inserting the hose into the guide and holder device of this invention;

FIG. 3 is a view similar to FIGS. 1 and 2 showing the hose inserted all the way in the guide and holder; and FIG. 4 is a plan view of a portion of the perforated garden hose showing a plurality of the guide and holder devices holding the hose in a predetermined arrangement such as might be employed in spraying a desired area to be irrigated.

Referring to the drawing in detail, reference numeral 10 designates the guide and holder device for the perforated hose 11, which is provided with three channels 11a, 11b and 11c, the upper surfaces of which are provided with small perforations through which the irrigating water spray is released. The device 10 may be made of iron wire of No. 12 or 13 A.W.G. size and it may be plated or coated to prevent or reduce corrosion. The lower part 12 of the device 10 is provided with a pointed end so that it may be readily inserted into the ground of the spraying area over which the hose is to be held and this part 12 may be made of different lengths so as to hold the hose at various heights above the ground. The upper part 13 of the device is formed in the shape of a hook having substantially flat horizontal parts 13a and 13c which are spaced apart and the left hand ends of which are integral with the curved portion 13b. The right hand end of the substantially horizontal part 13c is integral with the curved right hand member 13d, the lower part of which terminates in a rounded end 13e. Thus, there is provided an opening between the rounded end 13e and the curved portion joining the horizontal portion 13a to upper end of the vertical part 12.

The hose 11 is inserted into the hook 13 through the opening between the end 13e and the part 13a which opening is made slightly narrower than the diameters of the hose channels 11a–11c so that these channels have to be slightly compressed when the hose is inserted into the hook through this opening. FIG. 1 shows the hose partially inserted into the hook 13 with the hose channels 11b and 11c inside of hook and the channel 11a still to be inserted. In order to insert the channel 11a into the hook, this channel must be slightly compressed as shown in FIG. 2 and in addition, the channels 11b and 11c must be pressed downward as the upper surface of channel 11c engages the under surface of part 13c. The hose 11 is then pressed into the hook 13 and it is prevented from being accidentally removed therefrom by the inturned end 13e. The hose 11 has a certain small freedom of movement in the hook; however, the hose cannot be removed from the hook without applying a guiding force thereto such as will slightly deform the hose and pull it out of the hook opening. Sidewise force will not remove a hook from the hose because such force will only move the hose against the curved parts 13b and 13e of the hook.

The hooks 13 fit sufficiently loosely around the hose 11 so that these devices may be moved along the length of the hose readily and positioned, as shown in FIG. 4, at such points as may be required to hold the hose in a predetermined configuration so that the water spray will be directed to the desired parts of the irrigation area.

While I have shown a preferred embodiment of the invention, it will be understood that the invention is capable of variation and modification from the form shown so that its scope should be limited only by the scope of the claim appended hereto.

What I claim is:

A guide and holder device for a perforated garden hose for holding the hose over an irrigation area comprising an elongated wire member having a substantially straight lower portion with a point adapted to be inserted into the soil of the irrigation area, said body having an upper hook shaped portion with spaced upper and lower substantially horizontal portions having their corresponding ends joined to a curved side portion, said substantially horizontal upper portion having the other end thereof joined to a depending inwardly curved portion having a free end pointing toward the other end of said lower substantially horizontal portion, said free end of said depending inwardly curved portion being spaced from said lower portion to provide an opening to said hook through which the perforated garden hose is adapted to be inserted, said lower substantially horizontal portion and said inwardly curved depending portion being adapted to support a perforated hose in predetermined position.

References Cited by the Examiner
UNITED STATES PATENTS

| | | | |
|---|---|---|---|
| 674,161 | 5/1901 | Brown | 248—87 |
| 1,144,495 | 6/1915 | Nelson | 248—87 |
| 2,502,807 | 4/1950 | Temmer | 119—121 |
| 2,954,194 | 9/1960 | Alfano | 248—75 |

FOREIGN PATENTS 23,502  10/1904  Great Britain.

CLAUDE A. LE ROY, *Primary Examiner.*